United States Patent [19]

Paramest

[11] Patent Number: 5,647,272
[45] Date of Patent: Jul. 15, 1997

[54] BUCKET EXTRACTOR DEVICE

[76] Inventor: Sam Paramest, 17407 3rd Ave. SE., Bothell, Wash. 98012

[21] Appl. No.: 533,723

[22] Filed: Sep. 26, 1995

[51] Int. Cl.$^6$ .................................................. A47J 43/28
[52] U.S. Cl. .................. 99/495; 99/444; 141/331; 141/340; 141/343; 141/375; 210/474; 210/514; 210/517; 210/249
[58] Field of Search .................. 99/345–347, 444–446, 99/456, 495; 141/331, 375, 340, 343, 344, 363, 364; 210/514, 533, 534, 538, 800, 474, 249, 517; 222/510, 564

[56] References Cited

U.S. PATENT DOCUMENTS

| | | | |
|---|---|---|---|
| 3,865,023 | 2/1975 | Halvorsen | 99/444 X |
| 4,206,856 | 6/1980 | Lobel et al. | 210/514 X |
| 4,331,189 | 5/1982 | Joyner | 141/343 |
| 4,389,926 | 6/1983 | Joyner | 141/331 X |
| 4,464,265 | 8/1984 | Joyner | 210/517 |
| 4,640,185 | 2/1987 | Joyner | 99/495 |
| 4,934,420 | 6/1990 | Radna | 141/340 |
| 4,942,811 | 7/1990 | Kuhn | 99/495 |
| 5,199,349 | 4/1993 | Hansen | 99/495 |
| 5,297,476 | 3/1994 | Garland et al. | 99/495 |

*Primary Examiner*—Timothy F. Simone

[57] ABSTRACT

An extractor device for extracting, filtering, measuring, and containing a subsurface portion of liquid soup, which having less fat content mixed than a surface area, from a soup pot in a single dipping application; comprising: A cylinder, container body which has a center bottom hole for liquid to flow through. A perforated filter can be attached to the bottom hole for filtering during the extraction. The upper part of the container has a support structure and a handle connected. The plugging means is interconnected with the support structure to be constantly closing the bottom hole. The opening means is made to be activated to disengage the plugging means to open the bottom hole. Whereby the container can be dipped into a soup pot and set the bottom hole and a lower portion of the container at a subsurface of the liquid soup. After submerging, the opening means can be activated to disengage the plugging means to allow the liquid from the subsurface area to flow through the filter and bottom hole into the container. The container has two sets of measurement scales for setting and measuring during the opening means. Upon the liquid soup is filled up to an intended line, the opening means can be deactivated for the plugging means to be engaged for closing the bottom hole for containing and transferring low fat soup to another container or pot.

7 Claims, 3 Drawing Sheets

BUCKET EXTRACTOR DEVICE

BACKGROUND OF INVENTION

1. Field of Invention

This invention relates generally to a bucket type container extractor, which is for extracting, filtering, measuring and containing a subsurface portion of liquid soup from a cooking pot, for transferring to another pot or container.

2. Discussion of Prior Art

Meat based soup stock is widely used in the food service industry or in home cooking. For healthy cooking style, the fat portion of liquid soup is preferred to be separated for discarding. Therefore, some people may spend extra effort in trimming any visible fat portion of meat out before cooking. Or after cooking, some people may try to get rid of the liquid fat portion, which floats on the top surface of the cooking pot, by using a type of spool to take it out little by little. Recently, there is a bottom spout type pitcher which has become more popular in using to extract for low fat soup. However, people have to lift the heavy stock pot or cooking pot to tilt and pour the liquid soup into the pitcher. Further step is to pour a potion &liquid soup from the pitcher to transfer into another container. The lower spout of the pitcher is designed for liquid soup, which is on the bottom side of the pitcher, to flow out during the transferring. A major set back of this method is lifting and tilting works. Some of the stock pots are large, deep and very heavy. Besides, the pitcher does not have any filtering means. It may take up to three steps of lifting and pouring works to get a small amount of preferable low fat liquid soup.

In the past, people have attempted many different methods to extract low fat liquid soup. However, none of methods or devices has a quick, effective, simple and convenient means. Therefore, there is a need of a new and useful device, which is for extracting, measuring, filtering and containing low fat liquid soup from a cooking pot or stock pot in a single dipping application means.

SUMMARY AND OBJECTS OF INVENTION

Summary of Invention:

The "Bucket Extractor Device" has a cylinder container for containing liquid. The bottom wall of the container has a bottom center, fluid passage, hole opening. The bottom hole further has a protuberant, tube-like, edge with an external threaded end on the under side of the bottom wall, for a dome-shaped perforated filter, which has a matching internal threaded rim, to attach for filtering. The upper, exterior sides of the container has a pair of connector blocks connected across from each other. The container further has at least one set of measurement scale marking on its exterior side wall for a measuring means during the extracting process.

A support structure is connected between the container and a handle member. The support structure has an upside down U-shaped support bar, which has a flat, horizontal, middle part and two lower, shorter, vertical, sides. The U-shaped bar has a center hole opening. A rigid, straight, hollow, tube is connected to the top, center of the U-shaped bar. The hollow opening of the vertical tube is set to align with the center hole of the U-shaped bar. The lower ends of the vertical sides of the U-shaped bar are designed to be attached to the connector blocks of the container.

An elbow-shaped support, which has a lower, vertical end and a relative horizontal, upper end, is a support base for the handle. The lower, vertical end of the elbow-shaped support is connected to an upper side of the tube of the support structure and the upper end is connected with a handle grip.

The container has a plugging means for closing the bottom hole. The plugging means has a lower plug and an elongated push rod to be interconnected with the tube of the support structure. It also has an extension spring to brace the plug to be constantly engaged on the closing position. The plugging means can be disengaged to allow the fluid to flow through the bottom hole through the activation of an opening means of the device.

The opening means has a leverage means connected between the push rod and the handle support, to be activated to disengage the plugging means.

For time saving, the device can be applied for extracting, filtering, measuring, and containing low fat liquid soup in one dipping application. For the application, simply dip a lower part of the container below the surface of the liquid soup to set the bottom hole in a subsurface area. Then the opening means can be activated to disengage the plugging means to allow liquid soup from the subsurface, which has less fat content mixed than the top surface area, to flow through the filter and bottom hole for filling into the container. During this time, the container can be adjusted up or down for setting a line of the measurement scale to be leveled with the top surface of the liquid soup until the liquid soup is filled up to the line accordingly. Then, the opening means can be deactivated for the plugging means to close the bottom hole. The application of one dipping is completed. The container, then, can be removed to set on a center of another pot or jar. The opening means of the device can be reactivated to disengage the plugging means for releasing the liquid through the bottom hole.

The perforated filter can be detached from the container for cleaning. And the container can be detached from the support structure for cleaning and storing.

Objects of Invention:

(a) An object of making a support structure is for supporting the handle, which is to be held for dipping the container into a deep soup pot or stock pot on a vertical plane; and the support structure is timber made as a support base of the plugging means to be interconnected.

(b) Another object of making a bottom hole of the container is for extracting only a subsurface portion of liquid soup to flow into the container.

(c) An object of making the plugging means is for closing and sealing the bottom hole to prevent any liquid soup to flow into the container prior to the submerging and extracting means. The plugging means is also for closing the bottom hole to contain the extracted liquid soup.

(d) An object of making the opening means is for disengaging the plugging means to open the bottom hole of the container by simply pressing a thumb handle.

(e) Further object of making two sets of measurement scales, which are marked on the exterior side of the container, is to provide a mean of measuring during the dipping and extracting means for saving time.

(f) An object of making the support structure, handle and the opening means to be on a high position above the container is to avoid the wetness and greasiness of liquid soup for minimizing cleaning work after the extracting job is done.

(g) Another object of providing a detachable perforated filter for filtering during the extracting means is for saving the filtering time.

(h) Another object of making the container extractor which has detachable feature to separate the container away from the support structure is for a convenient of cleaning and storing means.

(i) A main object of this device, which is designed to function simultaneously for extracting, filtering, measuring, and containing low fat soup from a stock pot in a single dipping application, is for saving time and energy of the user.

DETAILED DESCRIPTION OF INVENTION

Figure 1:
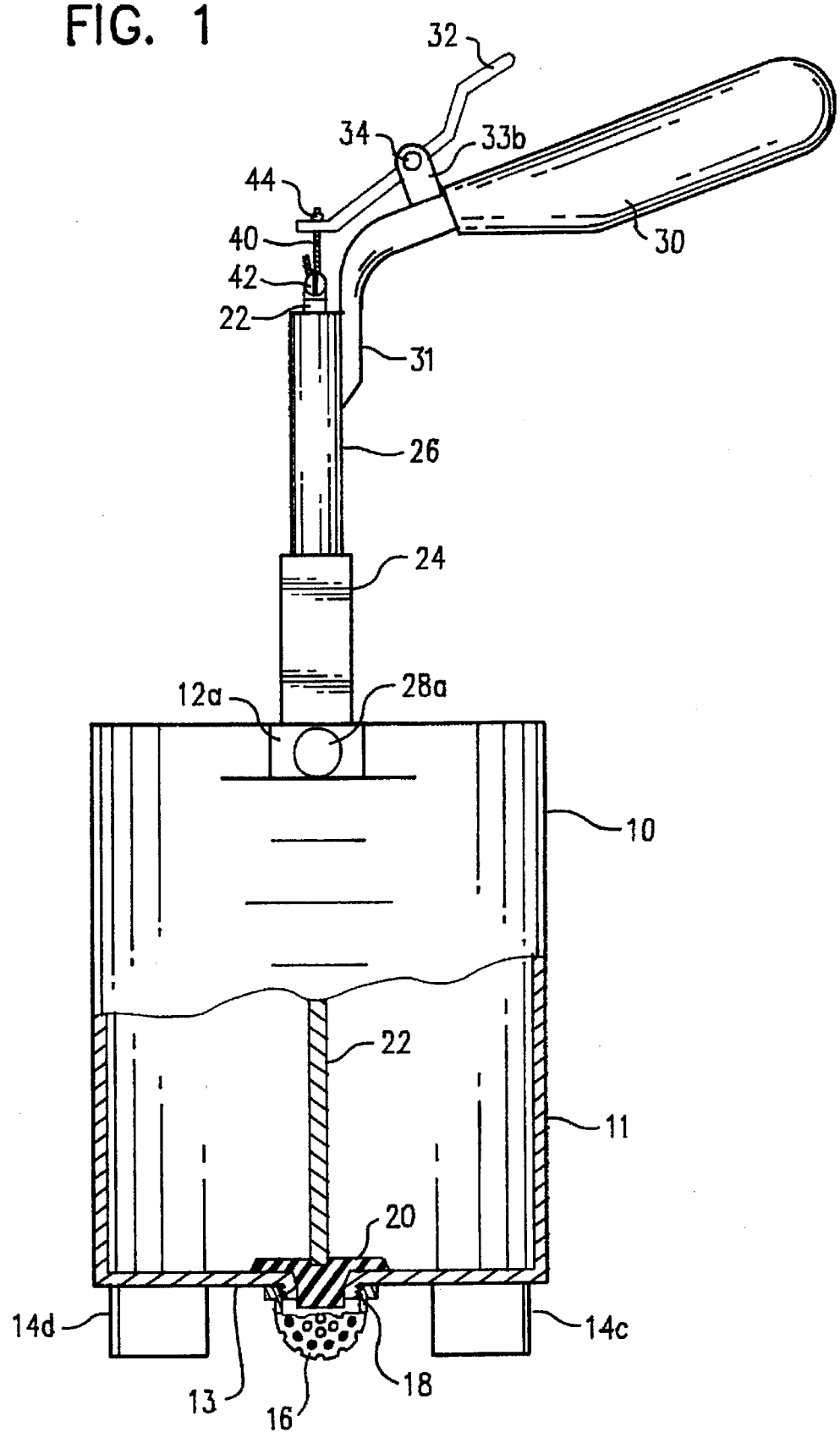
FIG. 1 shows a plane side view of the device with a sectional side view of the lower part of the device.
Figure 2:
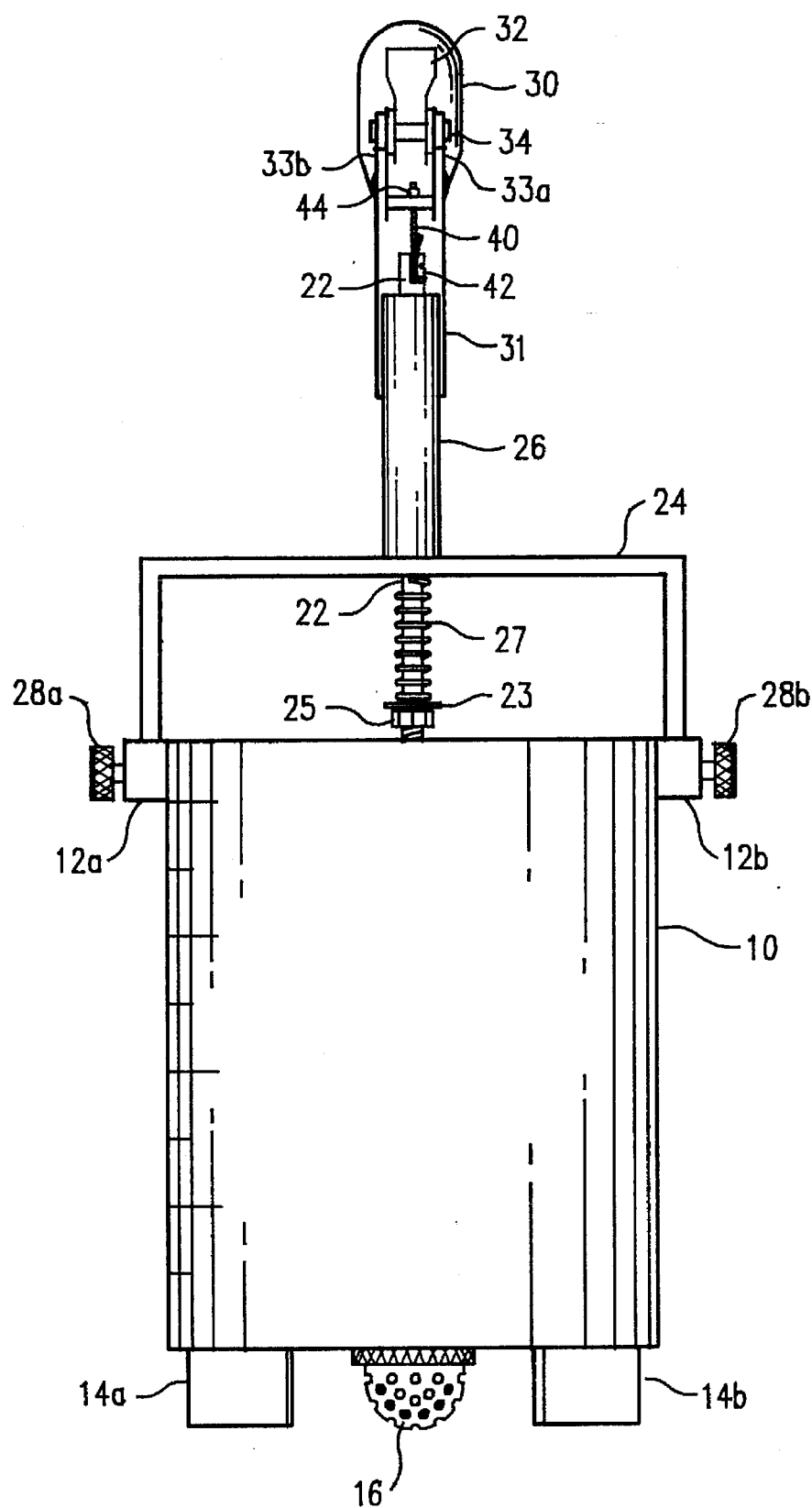
FIG. 2 shows a plane, front side view of the device.
Figure 3:
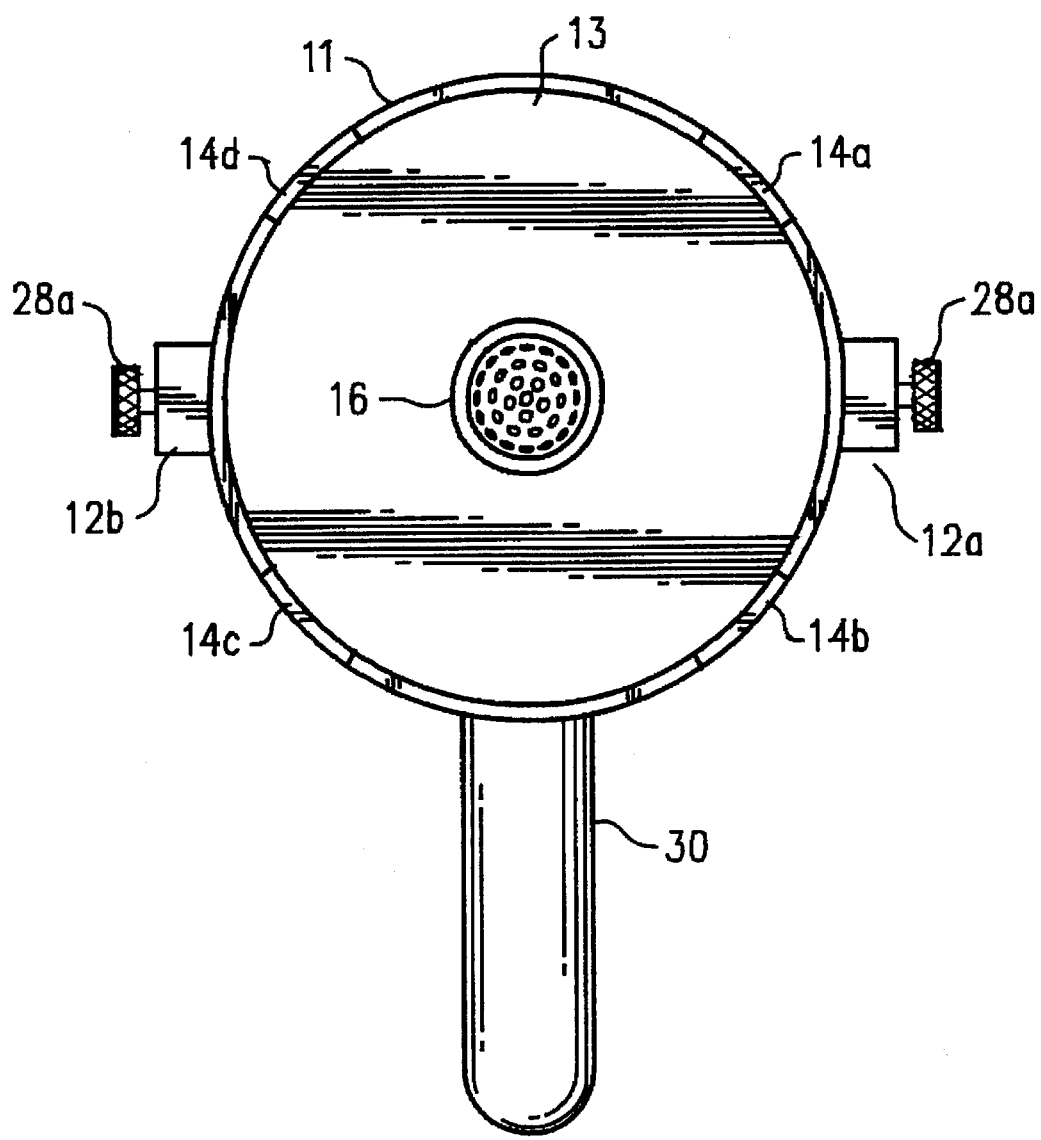
FIG. 3 shows a plane bottom side view of the device.

FIGS. 1 and 2 show a vertical position of the cylinder container body 10 of the device. FIG. 3 shows a bottom side of the device. The container 10 has a vertical, cylinder-shaped, enclosure side wall 11, which covers and is welded around the edge of a flat, round, horizontal, bottom wall 13, for containing liquid. Four narrow sections of the vertical side wall 11 further extend below the bottom wall to form four, vertical support legs 14a, 14b, 14c, and 14d. The container also has two connector blocks 12a and 12b connected across from each other on the upper, exterior rim of the side wall 11. Each of the connector blocks has a center slot opening on its top side. The connector block 12a has a horizontal, internal threaded hole made on its vertical side for a matching bolt 28a. And the connector 12b has a horizontal, internal threaded hole made on its vertical side for a matching bolt 28b. The bottom wall 13 has a round, fluid passage, center hole opening. The bottom hole further has an extended, protuberant, tube-like, edge 18 with an external threaded end made on the under side of the bottom wall. The container and its connecting parts can be made of a preferable plastic material through a molding production process. The container further has two opposite sets of the measurement scale lines marked on its exterior side. The measurement scales can be set for measuring the volume of the liquid soup during the dipping and extracting means.

A perforated dome-shaped filter 16 is made for coveting the bottom hole of the bottom wall. The filter 16 has a matching internal threaded mate made on its inner, rim for fastening with the external threaded end of the edge 18 of the bottom hole. The filter 16 can be made of a plastic material through a molding production process. After usage, the filter can be detached from the container for cleaning purpose.

FIGS. 1 and 2 show a support structure member which is connected between the container 10 and a handle member 30. The support structure has a wide, upside down U-shaped, support bar 24. The U-shaped bar is an elongated, flat, straight, horizontal bar, which is bent 90 degrees downwardly on each of its ends to form two lower, shorter, vertical sides. The longer, horizontal, middle part of the U-shaped bar has a center hole made. A rigid, elongated, straight, hollow tube 26 is connected vertically to the top center of the U-shaped bar. The hollow opening of the vertical tube is set to align with the center hole of the U-shaped bar. Each of the lower parts of the vertical sides of the U-shaped bar has a horizontal, internal threaded screw hole made. The support structure can be made of a plastic material. For the attachment with the container, one lower end of the U-shaped bar can be slid to fit into the top slot of the connector 12a; and the other lower end of the U-shaped bar can be slid to fit into the top slot of the connector 12b simultaneously. The two ends of the U-shaped bar can be locked to secure with the connectors 12a and 12b of the container by the bolt 28a and 28b respectively. The attachment also sets the center of the hollow opening of the vertical tube of the support structure to be aligned with the center of the bottom hole of the container. For convenience, the container 10 can be detached and separated from the support structure for cleaning and storing.

An elbow-shaped support 31, which has a lower, vertical end and a relative horizontal, upper end, is a support base for the handle. The lower, vertical end of the elbow-shaped support is connected to an upper side of the vertical tube of the support structure; and the upper end is connected with a handle grip 30. The handle grip and elbow support can be made of a plastic material.

The support structure is also made as a shell base for a plugging means to be interconnected. The plugging means comprises a rubber type plug member 20, which can be slid to fit for closing and sealing the bottom hole of the container. The rubber plug 20 has a center, internal threaded hole made on its top center. A solid, elongated, straight, push rod 22, which has a lower, external threaded end, is fastened to connect with the rubber plug. The push rod 22 further has an external threaded section made on its middle part for an adjusring nut 25 to fasten on as shown in FIG. 2. A spring base ring 23 and a metal compression spring 27 can be slid over the push rod to set on the adjusting nut 25 respectively. The top end of the push rod, then, can be slid through the center hole of the U-shaped bar 24 and the hollow opening of the tube 26. The upper end of the push rod is set above the top end of the vertical tube 26 and has a side screw 42 connected.

The compression spring 27 is set to cover the push rod between the spring base ring 23 and an under side of the U-shaped bar 24 of the support structure. The tension of spring 27 can be adjusted through the adjusting nut 25. The push rod is constantly being pushed downwardly by the spring 27 for the plug 20 to be engaged to close and seal the bottom hole of the container. However, the plug 20 can be lifted to open the bottom hole by the activation of the opening means.

The opening means has pair of vertical lever posts 33a and 33b connected on the top of the handle support 31 next to the handle grip 30. An elongated, metal, lever bar 32, which has a front end, a middle part and a rear end, is made. The middle part of the lever is connected pivotally to the lever posts by a pin 34. The lever is set to be relatively parallel to the handle grip 30. The front end of the lever has a cable hole and the rear end has a thumb handle made. A cable 40 has an upper end welded with an anchor bead 44. The lower end of the cable is slid through the cable hole of lever 32 and is connected with the top end of the push rod 22. The lower end of the cable 40 can be adjusted for the tension and fastened by the side screw 42. For the application of the opening means, the rear thumb handle of the lever can be pressed down by a thumb to tilt the front end of the lever up. The front end lever, therefore, forces the connected cable to lift the push rod and the connected plug on the lower end upwardly for the opening of the bottom hole.

The device is made for extracting and containing the type of meat base liquid soup from a soup pot or stock pot, in which is already cooked and cooled off. This type of liquid soup has more or less of the fat portion floating on the top surface of the soup after cooling. The device can be applied for extracting, filtering, measuring, and containing a subsurface soup portion in one dipping application. For the application, simply dip the device into the soup pot to submerge the bottom hole and a lower part of the container below the surface of the soup. Then press a thumb on the thumb handle of the lever to actuate the opening means to open the bottom hole. The portion of liquid soup from the subsurface, which has less fat content mixed, will flow through the filter 16 and bottom hole into the extractor container. For the measuring means, the container can be held and moved up or down to adjust for a line of the measurement scale of the container to be at the same level with the top surface of the soup in the stock pot. Eventually, the liquid soup will be filled into the container up to the intended line. The setting is to obtain a measurable amount of soup during the extracting means to save measurement time. When a desired amount of the low fat soup portion is extracted, the opening means can be deactivated by releasing the thumb handle off. The compression spring 27 of the plugging means, therefore, push the pusles rod downwardly for plunging the lower, rubber plug to close the bottom hole. Then, the container can be lifted to set the bottom hole in a center of another pot, or a storage jar, or other type of container. And the opening means of the extractor container, can be reactivated to open the bottom hole to release the extracted, low fat soup to complete the transferring means.

Although the description above contains a full and complete disclosure of this invention, these should not be construed as limiting the scope of the invention but as merely providing the preferred embodiment of the invention. The various modifications and alternates may be further employed without departing from the scope and spirit of this invention. For the examples, the plugging means can be made with any type of opening valves to control the flow of fluid. The level of the inlet or outlet can be designed to be located slightly higher than the bottom wall of the container. The shape of the cylinder container can be changed to a square, hexagon, or other shape, which has more than one vertical side walls to contain liquid. A top lid can be made to enclose the top opening of the container. And the steel metal material or other material combined, can be made to substitute some or all of the preferred plastic material. Therefore, the scope and spirit of the invention should be determined by the appended claims and their legal equivalents.

I claim:

1. An extractor device for extracting, filtering, measuring, and containing a subsurface portion of liquid soup, from a soup pot in a single dipping application; comprising:

(a) a rigid, container body, which having a horizontal bottom wall and at least one, vertical, enclosure side wall connected together, for containing said liquid;

(b) said side wall having at least one set of measurement scales marked on its exterior side for measuring said liquid soup;

(c) said bottom wall of said container further having a bottom hole opening;

(d) a detachable, perforated filter connected to an under side of said bottom wall to cover said bottom hole for filtering;

(e) a handle member;

(f) a rigid, support structure member connected between said handle and said container;

(g) plugging means interconnected to said support structure to be constantly engaged for closing said bottom hole of said container;

(h) at least one lever post connected to an upper part of said handle member;

(i) a rigid, elongated lever bar which having a front end, a middle part and a thumb handle end, wherein said middle part of said lever is connected pivotally to said lever post;

(j) a cable connected between said front end of said lever and said plugging means;

(k) whereby said container can be dipped vertically into said soup pot to set said bottom hole of said container to be below said surface of said liquid soup, and said thumb handle of said lever can be pressed by a thumb for pulling said cable to disengage said plugging means, and a line of said measurement scales can be set to be leveled with said surface of said liquid soup in said soup pot for said liquid soup to fill into said container through said bottom hole up to said line of said scales, then said thumb handle of said lever can be released for said plugging means to be reengaged in closing said bottom hole for said container to contain the extracted portion of said liquid soup.

2. The invention of claim 1 wherein said support structure, comprising:

(a) a rigid, up side down U-shaped support bar, which having a center, horizontal, upper part and two, lower, vertical sides;

(b) said center part of said U-shaped bar having a center hole opening;

(c) a rigid, elongated, hollow, straight, tube structure, connected vertically to a top center of said U-shaped bar;

(d) a lower end of each of said vertical sides of said U-shaped bar can be set to attach to or detach from said container.

3. The invention of claim 1 wherein said handle member, comprising:

(a) a rigid elbow-shaped support, which having a lower, vertical end and a relative horizontal, upper end;

(b) said lower, vertical end of said elbow-shaped support connected to an upper side of said vertical tube of said support structure.

4. A mechanical extractor device to be applied for separating and containing low fat content liquid soup by dipping directly into a soup pot to extract said liquid soup exclusively from a subsurface portion of said soup, wherein the invention comprising:

(a) a rigid, container body, which having a horizontal bottom wall and at least one vertical, enclosure side wall connected together, for containing said liquid soup;

(b) said bottom wall of said container further having a bottom hole opening;

(c) a handle member;

(d) a rigid, support structure member connected between said handle and said container;

(e) plugging means to be constantly active in engaging for dosing said bottom hole of said container; and (f) opening means, which having leverage means to be actuated for forcing said plugging means to be disengaged from said closing means temporarily, for opening said bottom hole of said container;

(g) whereby said container can be dipped vertically into said soup pot, and said opening means can be activated to extract said subsurface portion of said liquid soup to be filled through said bottom hole into said container up to a desired level, and said opening means can be deactivated for said closing means to be reengaged for closing said bottom hole, so that said extracted soup can be contained in said container.

5. The invention of claim 4 wherein said container further has a perforated filter member attached to cover said bottom hole of said container for filtering said soup.

6. The invention of claim 4 wherein said plugging means, comprising:

(a) a rubber plug member which can be set for closing said bottom hole of said container;

(b) a rigid, elongated, straight, push rod, which having a top end and a bottom end, interconnected to said support structure, wherein said bottom end of said push rod connected to a top center of said rubber plug member and said top end of said push rod is connected to said opening means;

(c) spring means being set for bracing and forcing said push rod to push said rubber plug for dosing said bottom hole constantly.

7. The invention of claim 4 wherein said opening means, comprising:

(a) at least one lever post connected to said handle member;

(b) a rigid, elongated, lever bar, and said lever bar having a front end, a middle part, and a rear thumb handle end, wherein said middle part of said lever connected pivotally to said lever post;

(c) a flexible connector connected between said front end of said lever and said top end of said push rod;

(d) whereby said thumb handle of said lever can be pressed by a thumb to tilt said front end of said lever to lilt said push rod and plug upwardly for opening said bottom hole of said container.

* * * * *